United States Patent [19]

Marans

[11] 3,862,099

[45] Jan. 21, 1975

[54] THERMOPLASTIC ADHESIVES

[75] Inventor: Nelson S. Marans, Silver Spring, Md.

[73] Assignee: W. R. Grace & Co., New York, N.Y.

[22] Filed: Dec. 12, 1973

[21] Appl. No.: 424,238

[52] U.S. Cl............ 260/93.7, 117/161, 161/182, 161/203, 161/216, 161/247, 161/250, 161/252, 250/87.3, 260/89.1, 260/92.8 A, 260/94.9 GA, 260/94.9 GB
[51] Int. Cl..................... C08f 29/02, C08f 45/72
[58] Field of Search................260/92.8 A, 94.9 GA, 94.9 GB, 260/89.1, 93.7

[56] References Cited
UNITED STATES PATENTS

| | | | |
|---|---|---|---|
| 3,135,722 | 6/1964 | Logemann | 260/85.5 M |
| 3,141,869 | 7/1964 | Dennstedt | 260/85.5 M |
| 3,515,709 | 6/1970 | Nelson et al. | 260/89.1 |

Primary Examiner—Harry Wong, Jr.
Attorney, Agent, or Firm—Elton Fisher; Kenneth E. Prince

[57] ABSTRACT

A thermoplastic adhesive comprising an intimate mixture of 100 parts of a thermoplastic polymer and 0.01–10 parts of a chelate of an aminoacetic acid or an aminopropionic acid and a polyvalent metallic ion, the chelate being free of acid hydrogen ions.

10 Claims, No Drawings ns
THERMOPLASTIC ADHESIVES

BACKGROUND OF THE INVENTION

This invention is in the field of ahesives. More particularly, it is in the field of thermoplastic adhesives. Still more particularly said invention is an improved thermoplastic adhesive useful as a hot melt adhesive.

SUMMARY OF THE INVENTION

In summary this invention is directed to a composition comprising an intimate mixture of 100 parts of a thermoplastic polymer and 0.01–10 parts of a chelate of;

a. an amino acid selected from a first group consisting of $$\underset{\substack{HOC(CH_2)_y \\ HOC(CH_2)_y \\ O}}{\phantom{X}} N - \left[ R_1 - \underset{(CH_2)_y}{N} - \right]_x (CH_2)_y\ COH$$

$$\underset{\substack{HOC(CH_2)_y \\ HOC(CH_2)_y \\ O}}{\phantom{X}} N - CH_2 - \underset{\substack{H \\ C \\ H}}{C} - CH_2 - N \underset{(CH_2)_y\ COH}{\overset{(CH_2)_y\ COH}{\phantom{X}}}\ ,\ or$$

$$R_2 - \underset{\substack{H \\ COH \\ O}}{\overset{H}{C}} - N - CH_2CH_2 - N - \underset{\substack{COH \\ O}}{\overset{H}{C}} - R_2$$

in which;

i. $R_1$ ia an alkylene group having 2-10 carbon atoms;

(ii) $R_2$ is $\langle O \rangle$-OH, HOC-$\langle O \rangle$-OH, HSO$_3$-$\langle O \rangle$-OH, or CH$_3$-$\langle O \rangle$-OH;

iii. $x$ is 0 or integer from 1 to 4; and (iv) $y$ is 1 to 2; and b. a metallic ion selected from a second group consisting of titanium, barium, cadmium, iron, manganese, lead, tin, copper, cobalt, zinc, or calcium the chelate being free of acid hydrogen ions.

Said composition is useful as a hot melt adhesive.

We generally prefer to select $R_2$ from $\langle O \rangle$-OH, HOC-$\langle O \rangle$-OH, HSO$_3$-$\langle O \rangle$-OH, and CH$_3$-$\langle O \rangle$-OH.

However, we have found that excellent results can be obtained where the methyl group of CH$_3$-$\langle O \rangle$-OH is replaced with a lower alkyl group or with an alkyl group having up to 8-10 carbon atoms. Such alkyl groups are equivalents of said methyl group.

DESCRIPTION OF PREFERRED EMBODIMENTS

In preferred embodiments of the invention recited in the above Summary:

1. The thermoplastic polymer is high density polyethylene, polypropylene, polyvinyl acetate, or polyvinyl chloride.

2. There is 0.1–2 parts of the chelate per 100 parts of thermoplastic polymer.

3. The first group member is $$\underset{\substack{HOC(CH_2)_y \\ HOC(CH_2)_y \\ O}}{\phantom{X}} N - \left[ R_1 - \underset{(CH_2)_y\ COH}{N} - \right]_x (CH_2)_y\ COH$$

wherein $x$ is 0 and $y$ is 1 and the second group member is tin, cadmium, lead, titanium, iron, or barium.

4. The first group member is $$\underset{\substack{HOC(CH_2)_y \\ HOC(CH_2)_y \\ O}}{\phantom{X}} N - \left[ R_1 - \underset{(CH_2)_y\ COH}{N} - \right]_x (CH_2)_y\ COH$$

wherein (a) $x$ is 1; (b) $y$ is 1; and (c) $R_1$ is —CH$_2$CH$_2$—; and the second group member is tin, cadmium, lead, titanium, iron, or barium.

5. The first group member is $$\underset{\substack{HOC(CH_2)_y \\ HOC(CH_2)_y \\ O}}{\phantom{X}} N - CH_2 - \underset{\substack{H \\ C \\ H}}{C} - CH_2 - N \underset{(CH_2)_y\ COH}{\overset{(CH_2)_y\ COH}{\phantom{X}}}$$

wherein $y$ is 1
and the second group member is tin, cadmium, lead, titanium, iron, or barium.

6. The first group member is $$R_2 - \underset{\substack{H \\ COH \\ O}}{\overset{H}{C}} - N - CH_2CH_2 - N - \underset{\substack{COH \\ O}}{\overset{H}{C}} - R_2$$

wherein $R_2$ is $\langle O \rangle$-OH, HSO$_3$-$\langle O \rangle$-OH or HOC-$\langle O \rangle$-OH;

and the second group member is tin, cadmium, lead, titanium, iron, or barium.

DETAILED DESCRIPTION OF THE INVENTION

It is an object of this invention to provide an improved or superior thermoplastic adhesive composition.

It is another object of this invention to provide such superior adhesive by admixing a thermoplastic polymer and a chelate of an aminoacetic or aminopropionic acid of the type recited in the above Summary and/or the above Preferred Embodiments.

The improved thermoplastic adhesive of this invention is especially useful for laminating metal foils to plastic films (to prepare laminates useful for packaging foods and other items), for sealing side seams of metallic cans, for sealing packages, and the like.

Metallic chelates (chelates of chelating aminoacids and polyvalent (including divalent) metallic ions are well known to those skilled in the art. Such chelates can be prepared by a number of well known methods including:

1. Reacting, in an aqueous system, an oxide of a polyvalent (including a divalent) metal with the free amino acid. By using substantially stoichiochmetric amounts of amino acid and oxide the resulting chelate is free of acid hydrogen ions and unreacted metallic oxide. If the chelate is insoluble in water, it can be recovered by filtration, decantation, or centrifugation and dried. If the chelate is soluble, the water can be evaporated from the aqueous reaction product to leave the chelate behind.

2. Reacting a salt of a polyvalent (including a divalent) metal with a chelating amino acid in an aqueous system, adjusting the pH with base to give maximum stability to the metal chelate, and recovering the resulting chelate. This method is especially useful to form chelates of polyvalent metallic ions (such as iron (III)) whose oxide is insoluble.

Various other methods for preparing the chelates used in this invention will be readily apparent to those skilled in the art.

I prefer to form the composition of this invention by admixing the metallic chelate and the thermoplastic polymer in a Brabender mixing apparatus for a period of about 5 minutes. I have found that a mixing temperature of 200°C is preferred for polypropylene, high density polyethylene, and polyvinyl chloride. I have also found that a temperature of about 150°C is sufficient for low density polyethylene and for ethylene-vinyl acetate copolymers. One of ordinary skill in the art can readily determine the preferred mixing temperature for any thermoplastic polymer. Such temperature is below the decomposition temperature of the polymer and above its melting point.

In no instance did the addition of a chelate to any of the thermoplastic polymers tested give polymer decomposition or crosslinking. On the contrary, the torque, while operating the Brabender apparatus at a constant speed remained constant, thereby indicating an absence of decomposition or crosslinking which would have changed the torque. Where mixing polyvinyl chloride about 3 percent, based on the weight of the polyvinyl chloride, of a commercially available polyvinyl chloride stabilizer (Advastab T-17M obtained from Cincinnati Milacron Chemicals, Inc.) was included in the mix because decomposition occurred in a trial run, using polyvinyl chloride without chelate and without stabilizer.

The composition of this invention can be used as a hot melt adhesive. It can be used to bond wood to wood, wood to metal, wood to concrete, wood to plastic, metal to metal, metal to plastic, plastic to concrete, ceramic material to ceramic material, wood to ceramic material, wood to glass, glass to ceramic material, plastic to glass, plastic to paper, and the like.

The instant invention will be better understood by referring to the following specific but nonlimiting examples. It is understood that said invention is not limited by said examples which are offered merely as illustrations; it is also understood that modifications can be made without departing from the spirit and scope of the invention.

EXAMPLE 1

100 part of high density polyethylene and 1 part of an ethylenediaminetetraacetic acid chelate of titanium having the formula (EDTA)Ti, in which EDTA is

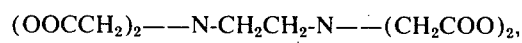

$(OOCCH_2)_2$——$N$-$CH_2CH_2$-$N$——$(CH_2COO)_2$, was blended in a Brabender mixing apparatus for 5 minutes at 200°C, a temperature above the polymer's melting point, to form an improved thermoplastic adhesive of this invention. Said improved thermoplastic adhesive was removed from the mixing apparatus, recovered and designated "Adhesive 1."

A 1.08 g portion of said Adhesive 1 was pressed using a Carver press at 200°C, a temperature above the polymer's melting point, into a sheet having an area of 36 square inches. Said sheet was cooled below its melting point and a portion of it was used to heat seal two overlapping tin-free ether-washed steel coupons to each other. Each coupon was 13 mils thick and the lapped (sealed) area was 1 square inch.

The lap shear (a measure of bonding strength) of the sealed steel coupons was measured on an Instron testing apparatus and found to be 722 psi. This contrasts with a value of 91 psi obtained with high density polyethylene from the same lot but without the chelating agent.

EXAMPLE 2

A number of runs was made using the general procedure of Example 1. Said procedure was modified as indicated in the following table which reports the results of said runs. Among such modifications are:

1. Using for each run the chelate and polymer listed for such run. (Control runs were made as indicated in said table without the addition of a chelate and some runs were made using the chelate or polymer of Example 1.)

2. Using in some runs (as indicated in said table) ether-washed aluminum coupons rather than tin-free ether-washed steel coupons.

3. Using a mixing (blending) temperature and a pressing temperature of 150°F where blending or pressing low density polyethylene.

IMPROVED ADHESIVES

| Run No. | Chelate | Polymer | Composition of Coupon | Lap Shear, Psi |
|---|---|---|---|---|
| 1 | None | High Density Polyethylene | Tin-Free Steel | 91 |
| 2 | NTANaCa (1) | " | " | 172 |
| 3 | NTA(NH$_4$)Zn (1) | " | " | 280 |
| 4 | NTANaPb (1) | " | " | 184 |
| 5 | EDTASn (2) | " | " | 222 |
| 6 | EDTANaFe (2) | " | " | 195 |
| 7 (3) | None | Polyvinyl Chloride | " | 97 |
| 8 (3) | EDTATi (2) | " | " | 132 |
| 9 (3) | EDTASn (2) | " | " | 167 |
| 10 (3) | NTAFe (1) | " | " | 287 |
| 11 (3) | NTANaCu (1) | " | " | 339 |
| 12 (3) | EDTANa$_2$Cu (2) | " | " | 300 |
| 13 (3) | NTANaCa (1) | " | " | 296 |
| 14 (3) | NTA(NH$_4$)Zn (1) | " | " | 158 |
| 15 (3) | NTANaMn (1) | " | " | 372 |
| 16 (3) | NTANaPb (1) | " | " | 249 |
| 17 (3) | EDTAPb (2) | Polyvinyl Chloride | " | 164 |
| 18 (3) | EDTANa$_2$Mn (2) | " | " | 304 |
| 19 (3) | EDTANaFe (2) | " | " | 340 |
| 20 (3) | EDTAZn$_2$ | " | " | 160 |
| 21 (3) | EDTPTi (4) | " | " | 310 |
| 22 (3) | EDTPBa$_2$ (4) | " | " | 505 |
| 23 (3) | NTPFe (5) | " | " | 484 |
| 24 (3) | (NTP)$_2$Co$_3$ (5) | " | " | 388 |
| 25 (3) | $\left( R_2\text{-}\underset{\underset{O}{\overset{\|}{CO}}}{\overset{H}{\overset{\|}{C}}}\text{-}\underset{H}{\overset{H}{N}}\text{-}CH_2CH_2\text{-}\underset{H}{\overset{H}{N}}\text{-}\underset{\underset{O}{\overset{\|}{CO}}}{\overset{H}{\overset{\|}{C}}}\text{-}R_2 \right)Ba$ (6) | " | " | 600 |
| 26 (3) | $\left( R_2\text{-}\overset{H}{\underset{CO}{C}}\text{-}\overset{H}{N}\text{-}CH_2CH_2\text{-}\overset{H}{N}\text{-}\overset{H}{\underset{CO}{C}}\text{-}R_2 \right)Ti$ (7) | " | " | 540 |
| 27 | $\left( R_2\text{-}\overset{H}{\underset{CO}{C}}\text{-}\overset{H}{N}\text{-}CH_2CH_2\text{-}\overset{H}{N}\text{-}\overset{H}{\underset{CO}{C}}\text{-}R_2 \right)_3 Fe_4$ (8) | High Density Polyethylene | Tin-Free Steel | 710 |
| 28 (9) | None | Low Density Polyethylene | " | 587 |
| 29 (9) | EDTASn (2) | " | " | 908 |
| 30 (9) | NTANaPb (1) | " | " | 800 |

(continuation)

IMPROVED ADHESIVES

| Run No. | Chelate | Polymer | Composition of Coupon | Lap Shear, Psi |
|---|---|---|---|---|
| 31 | None | Polyvinyl Acetate | Tin-Free Steel | 263 |
| 32 | EDTASn (2) | " | " | 326 |
| 33 | EDTANaFe (2) | " | " | 345 |
| 34 | EDTACd$_2$ (2) | " | " | 402 |
| 35 (3) | None | Polyvinyl Chloride | Aluminum | 102 |
| 36 (3) | EDTAHFe (2,10) | " | " | 0 |
| 37 (3) | EDTANa$_2$Cd (2) | " | " | 420 |
| 38 (3) | EDTAH$_2$Cd (2,10) | " | " | 1 |
| 39 (3) | NTAHBa (1, 10) | Polyvinyl Chloride | Aluminum | 5 |
| 40 (3) | NTANaBa (1) | " | " | 460 |
| 41 (3) | NTANaCa (1) | " | " | 281 |
| 42 | None | Polyvinyl Acetate | " | 175 |
| 43 | EDTASn (2) | " | " | 284 |
| 44 | EDTATi (2) | " | " | 298 |
| 45 | EDTPBa$_2$ (4) | " | " | 275 |
| 46 | EDTPCo$_2$ (4) | " | " | 310 |
| 47 | EDTPH$_2$Co (4,10) | " | " | 0 |
| 48 | EDTPNa$_2$Co (4) | " | " | 304 |
| 49 (9) | None | Low Density Polyethylene | " | 675 |
| 50 (9) | NTANaPb (1) | " | " | 722 |
| 51 (9) | 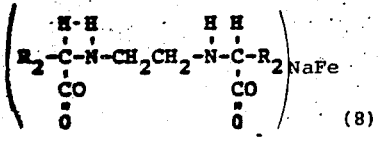 (8) | Low Density Polyethylene | Aluminum | 950 |
| 52 (9) | 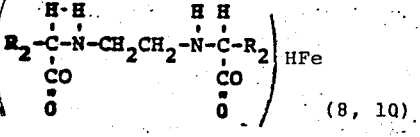 (8, 10) | " | " | 0 |
| 53 (9) | 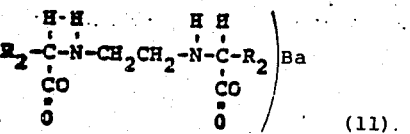 (11) | " | " | 1,108 |
| 54 (9) | 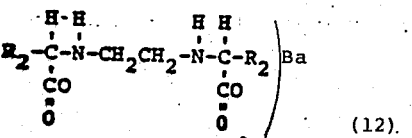 (12) | " | " | 1,140 |

(continuation)
IMPROVED ADHESIVES
| Run No. | Chelate | Polymer | Composition of Coupon | Lap Shear, Psi |
|---|---|---|---|---|
| 55 (9) | NTPNaCa (5) | Low Density Polyethylene | Aluminum | 1,010 |
| 56 | None | Polypropylene | " | 0 |
| 57 | EDTANa$_2$Ba (2) | " | " | 200 |
| 58 | EDTANa$_2$Ca (2) | " | " | 208 |
| 59 | None | " | Tin-Free Steel | 2 |
| 60 | EDTANa$_2$Ba (2) | " | " | 230 |
| 61 | EDTANa$_2$Ca (2) | " | " | 205 |
| 62 | 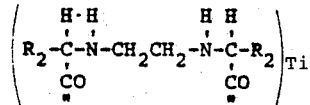 | " | " | 280 |
| 63 | 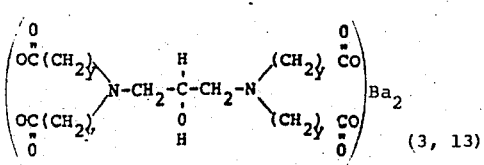 | Polyvinyl Chloride | Tin-Free Steel | 400 |
| 64 | 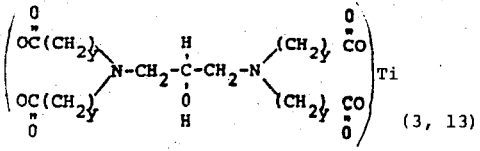 | " | " | 385 |
| 65 | 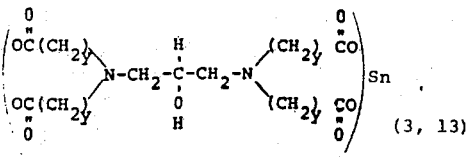 | " | " | 375 |
| 66 | 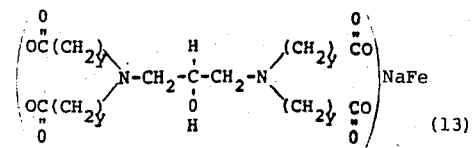 | High Density Polyethylene | Tin-Free Steel | 298 |
| 67 | 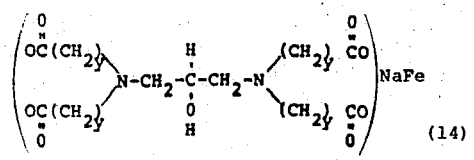 | " | " | 296 |
| 68 | 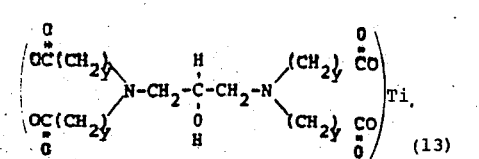 | " | " | 305 |

(continuation)

IMPROVED ADHESIVES

| Run No. | Chelate | Polymer | Composition of Coupon | Lap Shear, Psi |
|---|---|---|---|---|
| 69 | 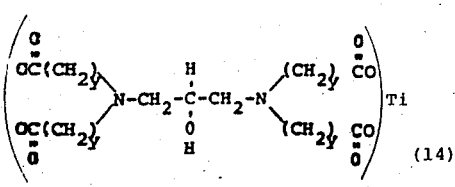 (14) | High Density Polyethylene | Tin-Free Steel | 300 |

Footnotes to tables

1. NTA means the nitriotriacetate anion, $N-(CH_2COO)_3$.

2. EDTA means the ethylenediaminetetraacetate anion, $(OOCCH_2)_2-(-NCH_2CH_2-)-(CH_2COO)_2$.

3. 3% of a stabilizer (Advastab T-17M obtained from Cincinnati Milacron Chemicals, Inc.) based on the weight of the polyvinyl chloride was included in the mix.

4. EDTP means the ethylenediaminetetrapropionate anion, $(OOCCH_2CH_2)_2-(-NCH_2CH_2N-)-(CH_2CH_2COO)_2$.

5. NTP means the nitrilotripropionate anion, $N-(CH_2CH_2COO)_3$.

6. $R_2$ is ⟨O⟩-OH.

7. $R_2$ is $SO_3$-⟨O⟩-OH.

8. $R_2$ is $\underset{O}{OC}$-⟨O⟩-OH.

9. Mixing (blending) temperature and pressing temperature were 150°C.

10. This run shows the adverse effect of free hydrogen ions.

11. $R_2$ is $CH_3$-⟨O⟩-OH.

12. $R_2$ is $n-C_8H_{17}$-⟨O⟩-OH.

13. y is 1.

14. y is 2.

As used herein the term "g" means gram or grams.
As used herein the term "psi" means pounds per square inch.
As used herein the term "mole" has its generally accepted meaning—a mole of a substance being that quantity of the substance which contains the same number of molecules of the substance as there are carbon atoms in 12 g of pure $^{12}C$.

As used herein, the term "percent (percent)" means parts per 100 and the term "parts" means parts by weight unless otherwise defined where used.
As used herein the term "mil" means 0.001 inch. Thus 0.063 inch is 63 mils and 0.1 inch is 100 mils.
As used herein "EDTA" means the ethylenediaminetetraacetate anion, $(OOCCH_2)_2$—$NCH_2CH_2N$—$(CH_2COO)_2$.

As used herein "EDTP" means the ethylenediaminetetrapropionate anion, $(OOCCH_2)_2$—$NCH_2CH_2CH_2N$—$(CH_2CH_2COO)_2$.

As used herein "NTA" means the nitrilotriacetate anion, $N-(CH_2COO)_3$.

As used herein "NTP" means the nitrilotripropionate anion, $N-(CH_2CH_2COO)_3$.

I claim:

1. A hot melt adhesive composition consisting essentially of an intimate mixture of 100 parts of a thermoplastic polymer selected from the group consisting of high density polyethylene, low density polyethylene, and polypropylene and 0.01-10 parts of a chelate of:

a. an amino acid selected from a first group consisting of

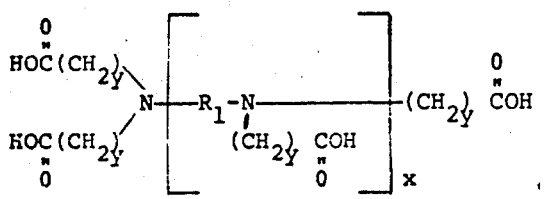

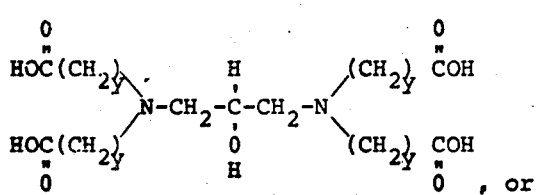

, or

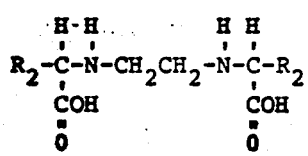

in which;
 i. $R_1$ is an alkylene group having 2-10 carbon atoms;

(ii) 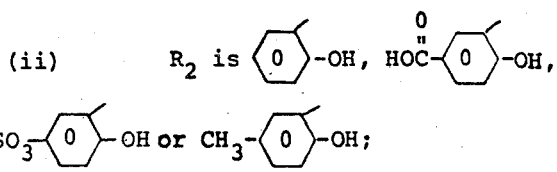

iii. $x$ is 0 or an integer from 1 to 4; and iv. $y$ is 1 or 2; and b. a metallic ion selected from a second group consisting of titanium, barium, cadmium, iron, manganese, lead, tin, copper, cobalt, zinc, or calcium the chelate being free of acid hydrogen ions.

2. The composition of claim 1 in which there is 0.1-2.0 parts of the chelate per 100 parts of thermoplastic polymer.

3. The composition of claim 1 in which the first group member is

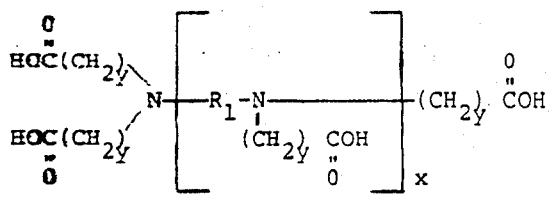

wherein $x$ is 0 and $y$ is 1.

4. The composition of claim 3 in which the second group member is tin, cadmium, lead, titanium, iron, or barium.

5. The composition of claim 1 in which the first group member is

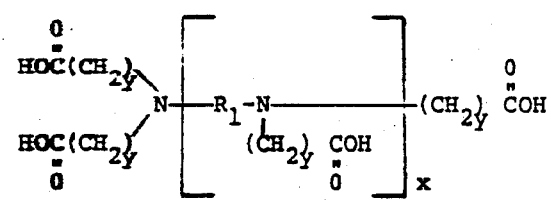

wherein (a) $x$ is 1; (b) $y$ is 1; and (c) $R_1$ is $-CH_2CH_2-$.

6. The composition of claim 5 in which the second group member is tin, cadmium, lead, titanium, iron, or barium.

7. The composition of claim 1 in which the first group member is

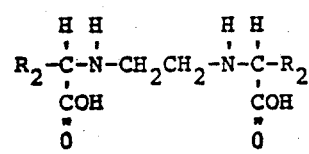

wherein $y$ is 1.

8. The composition of claim 7 in which the second group member is tin, cadmium, lead, titanium, iron, or barium.

9. The composition of claim 1 in which the first group member is

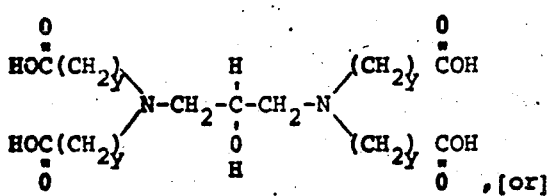

, [or]

wherein $R_2$ is <img>-OH, HSO_3-<img>-OH or HOC-<img>-OH.

10. The composition of claim 9 in which the second group member is tin, cadmium, lead, titanium, iron, or barium.

* * * * *

UNITED STATES PATENT OFFICE
CERTIFICATE OF CORRECTION

PATENT NO. : 3,862,099
DATED : January 21, 1975
INVENTOR(S) : Nelson S. Marans

It is certified that error appears in the above-identified patent and that said Letters Patent are hereby corrected as shown below:

In Claim 7 (Column 14) delete

" 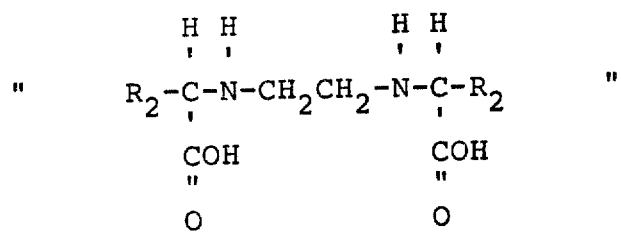 "

and replace the deleted material with

-- 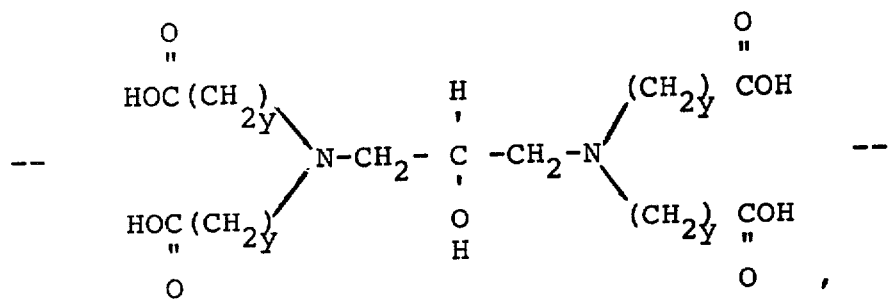 -- omitting the word ["or"] as printed in Claim 9.

UNITED STATES PATENT OFFICE
CERTIFICATE OF CORRECTION

Patent No. 3,862,099    Dated January 21, 1975

Inventor(s) Nelson S. Marans

It is certified that error appears in the above-identified patent and that said Letters Patent are hereby corrected as shown below:

In Claim 9 (Column 14) delete

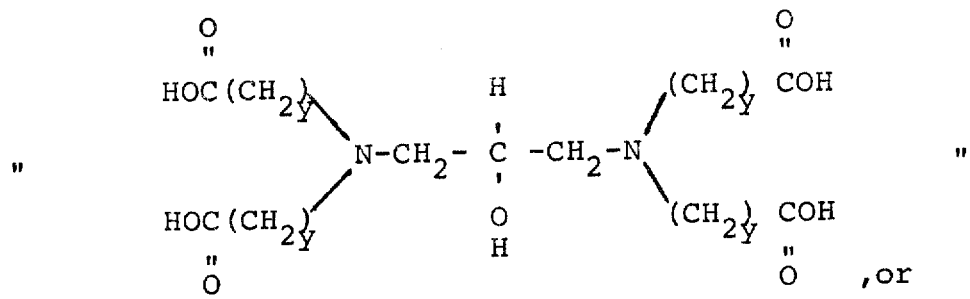

", or and replace the deleted material with

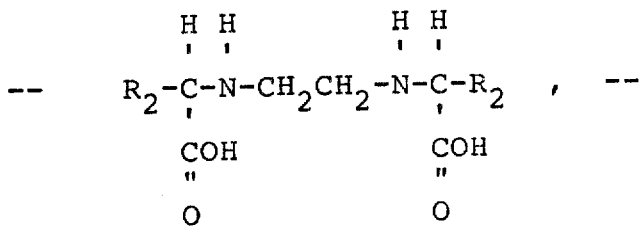

Signed and sealed this 15th day of July 1975.

(SEAL)
Attest:

RUTH C. MASON
Attesting Officer

C. MARSHALL DANN
Commissioner of Patents
and Trademarks